United States Patent
Ishii et al.

(10) Patent No.: US 10,254,179 B2
(45) Date of Patent: *Apr. 9, 2019

(54) ENCLOSURE SURFACE TEMPERATURE ESTIMATION METHOD AND ELECTRONIC APPARATUS

(71) Applicant: FUJITSU LIMITED, Kawasaki-shi, Kanagawa (JP)

(72) Inventors: Masatoshi Ishii, Kawasaki (JP); Yoshiyasu Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 498 days.

This patent is subject to a terminal disclaimer.

(21) Appl. No.: 14/939,047

(22) Filed: Nov. 12, 2015

(65) Prior Publication Data
US 2016/0187272 A1 Jun. 30, 2016

(30) Foreign Application Priority Data

Dec. 25, 2014 (JP) ................ 2014-262672
Aug. 4, 2015 (JP) ................ 2015-154015

(51) Int. Cl.
*G01N 25/18* (2006.01)
*G01K 7/42* (2006.01)

(52) U.S. Cl.
CPC ................ *G01K 7/42* (2013.01)

(58) Field of Classification Search
None
See application file for complete search history.

(56) References Cited

U.S. PATENT DOCUMENTS

| | | | |
|---|---|---|---|
| 4,843,577 A | 6/1989 | Muramoto | |
| 5,738,441 A | 4/1998 | Cambridge et al. | |
| 6,169,274 B1 | 1/2001 | Kulp | |
| 6,326,597 B1 * | 12/2001 | Lubomirsky | H01L 21/67248 |
| | | | 118/723 R |

(Continued)

FOREIGN PATENT DOCUMENTS

| | | |
|---|---|---|
| JP | 62-204133 | 9/1987 |
| JP | 9-304195 | 11/1997 |
| JP | 2000-252181 | 9/2000 |
| JP | 2001-520741 | 10/2001 |
| JP | 2005-159317 | 6/2005 |

(Continued)

OTHER PUBLICATIONS

Josef L. Miler, Limits of Hotspot Detection and Prediction in Microprocesors, A Dissertation Submitted to the Department of Mechanical Engineering and the Committee on Graduate Studies of Stanford University in Partial Fulfillment of the Requirements for the Degree of Doctor of Philosophy, Jun. 2012, 123 pages.*

(Continued)

*Primary Examiner* — Tung S Lau
(74) *Attorney, Agent, or Firm* — Staas & Halsey LLP

(57) ABSTRACT

A processor disposed over a substrate of an electronic apparatus acquires a first measured value from a temperature sensor disposed on the substrate, and calculates surface temperature of a surface of an enclosure of the electronic apparatus on the basis of a transfer function G(s) based on a first thermal resistance and a first thermal capacitance between a heat source over the substrate and the surface of the enclosure, a transfer function H(s) based on a second thermal resistance and a second thermal capacitance between the heat source and the temperature sensor, and the first measured value.

12 Claims, 18 Drawing Sheets

(56) References Cited

U.S. PATENT DOCUMENTS

| | | | |
|---|---|---|---|
| 2003/0066638 A1* | 4/2003 | Qu | F24S 10/90 165/186 |
| 2007/0074660 A1 | 4/2007 | Park et al. | |
| 2012/0075992 A1 | 3/2012 | Shahidi et al. | |
| 2017/0147017 A1* | 5/2017 | Ishii | G05D 23/1917 |
| 2017/0351279 A1* | 12/2017 | Ishii | G05D 23/24 |

FOREIGN PATENT DOCUMENTS

| | | |
|---|---|---|
| JP | 2009-210282 | 9/2009 |
| JP | 2011-10134 | 1/2011 |
| JP | 2013-546214 | 12/2013 |

OTHER PUBLICATIONS

Yonghong Yang, ISAC: Integrated Space and Time Adaptive Chip-Package Thermal Analysis, p. 1-13, IEEE 2006.*

Karthik Sankaranarayanan, Thermal Modeling and Management of Microprocessors, 2009, 173 pages.*

J-PlatPat Abstract, Publication No. 62-204133, Published Sep. 8, 1987.

J-PlatPat Abstract, Publication No. 09-304195, Published Nov. 28, 1997.

J-PlatPat Abstract, Publication No. 2000-252181, Published Sep. 14, 2000.

Espacenet Abstract, Publication No. 2001-520741, Published Oct. 30, 2001.

J-PlatPat Abstract, Publication No. 2005-159317, Published Jun. 16, 2005.

J-PlatPat Abstract, Publication No. 2009-210282, Published Sep. 17, 2009.

J-PlatPat Abstract, Publication No. 2011-010134, Published Jan. 13, 2011.

Espacenet Abstract, Publication No. 2013-546214, Published Dec. 26, 2013.

* cited by examiner

ENCLOSURE SURFACE TEMPERATURE ESTIMATION METHOD AND ELECTRONIC APPARATUS

CROSS-REFERENCE TO RELATED APPLICATIONS

This application is based upon and claims the benefit of priority of the prior Japanese Patent Application No. 2014-262672, filed on Dec. 25, 2014, and the Japanese Patent Application No. 2015-154015, filed on Aug. 4, 2015, the entire contents of which are incorporated herein by reference.

FIELD

The embodiments discussed herein are related to an enclosure surface temperature estimation method and an electronic apparatus.

BACKGROUND

With electronic apparatus, such as smart phones, tablet personal computers (PCs), and notebook PCs, which are used in a state in which they are touching human hands or knees, an influence on the human body, such as burns, is apprehended when the surface temperature of the enclosures rises.

Formerly the following technique was proposed. Temperature is detected by a temperature sensor disposed on the surface of an enclosure of an electronic apparatus. When a detection result exceeds a threshold, control is exercised so as to lower the surface temperature.

See, for example, Japanese National Publications of International Patent Applications No. 2013-546214 and No. 2001-520741, and Japanese Laid-open Patent Publications No. 2011-010134, No. 2005-159317, No. 2000-252181, and No. 09-304195.

By the way, with electronic apparatus such as portable terminals disposing temperature sensors on the surfaces of the enclosures may mar the appearances. Therefore, a temperature sensor may be disposed on a substrate in an enclosure. In this case, a fixed value is subtracted from a measured value obtained by the temperature sensor. By doing so, the surface temperature of the enclosure is estimated.

With the method of subtracting the fixed value from the measured value obtained by the temperature sensor disposed on the substrate, however, an error between the actual surface temperature of the enclosure and a calculated surface temperature of the enclosure increases due to fluctuations in the temperature of a heat source.

SUMMARY

According to an aspect, there is provided an enclosure surface temperature estimation method including acquiring, by a processor disposed over a substrate of an electronic apparatus, a first measured value from a first temperature sensor disposed on the substrate and calculating, by the processor, surface temperature of a surface of an enclosure of the electronic apparatus on the basis of a first transfer function based on a first thermal resistance and a first thermal capacitance between a heat source over the substrate and the surface of the enclosure, a second transfer function based on a second thermal resistance and a second thermal capacitance between the heat source and the first temperature sensor, and the first measured value.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
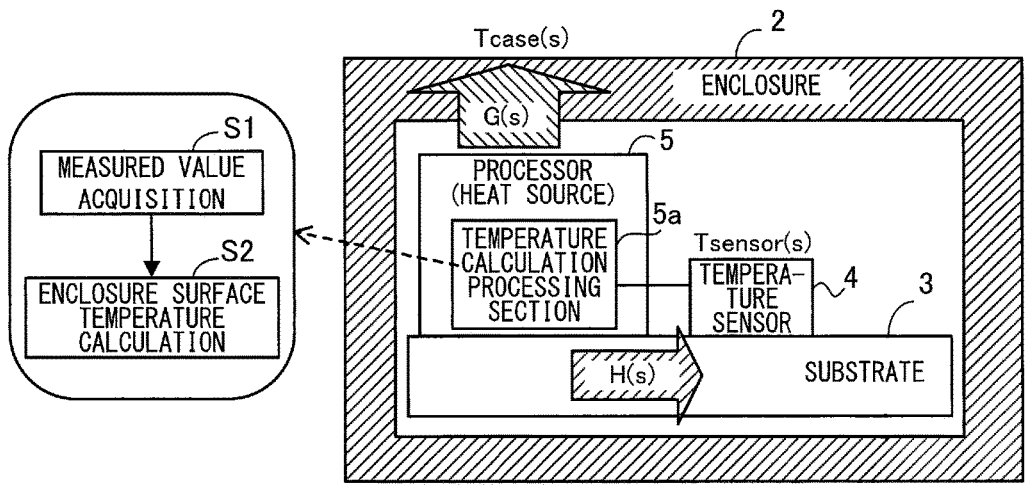
FIG. 1 illustrates an example of an enclosure surface temperature estimation method and an electronic apparatus according to a first embodiment.

Embodiments will now be described with reference to the accompanying drawings, wherein like reference numerals refer to like elements throughout.

First Embodiment

FIG. 1 illustrates an example of an enclosure surface temperature estimation method and an electronic apparatus according to a first embodiment.

An electronic apparatus 1 includes an enclosure 2, a substrate 3, a temperature sensor 4 disposed on the substrate 3, and a temperature calculation processing section 5a.

The temperature calculation processing section 5a calculates the surface temperature of the enclosure 2 on the basis of a transfer function based on a thermal resistance and a thermal capacitance between a heat source over the substrate 3 and the surface of the enclosure 2, a transfer function based on a thermal resistance and a thermal capacitance between the heat source and the temperature sensor 4, and a measured value obtained by the temperature sensor 4. A main heat source in the electronic apparatus 1 is a processor 5 which performs calculations, so description will now be given on the premise that a heat source is the processor 5.

In the example of FIG. 1, the function of the above temperature calculation processing section 5a is performed by the processor 5.

It is assumed that values obtained by Laplace-transforming the temperature of the processor 5, the surface temperature of the enclosure 2, and a measured value obtained by the temperature sensor 4, which are functions of time, are Tcpu(s), Tcase(s), and Tsensor(s) respectively (s is an operator of Laplace transform). At this time the relationship between Tcpu(s) and Tcase(s) is expressed as $$T\text{case}(s)=G(s)T\text{cpu}(s) \quad (1)$$

where G(s) is a transfer function.

Furthermore, the relationship between Tcpu(s) and Tsensor(s) is expressed as $$T\text{sensor}(s)=H(s)T\text{cpu}(s) \quad (2)$$

where H(s) is a transfer function.

From expressions (1) and (2), Tcase(s) is expressed as $$T\text{case}(s)=\{G(s)/H(s)\}T\text{sensor}(s) \quad (3)$$

The transfer functions G(s) and H(s) are expressed, by the use of, for example, a thermal circuit model corresponding to a first-order low-pass filter circuit, as:

$$G(s)=K_G/(1+s\tau_G) \quad (4)$$

$$H(s)=K_H/(1+s\tau_H) \quad (5)$$

where $K_G$ is a heat transfer coefficient between the processor 5 and the surface of the enclosure 2, $\tau_G$ is a thermal time constant between the processor 5 and the surface of the enclosure 2 and is expressed as the product of the thermal resistance value $R_G$ and the thermal capacitance value $C_G$ between the processor 5 and the surface of the enclosure 2, $K_H$ is a heat transfer coefficient between the processor 5 and the temperature sensor 4, and $\tau_H$ is a thermal time constant between the processor 5 and the temperature sensor 4 and is expressed as the product of the thermal resistance value $R_H$ and the thermal capacitance value $C_H$ between the processor 5 and the temperature sensor 4.

The above parameters $K_G$, $K_H$, $\tau_G$, $\tau_H$ are determined in advance on the basis of measured values and are stored in, for example, a storage section (not illustrated) (example of a method for determining the parameters will be described later).

The temperature calculation processing section 5a applies the value of Tsensor(s) to expression (3) to find Tcase(s). The temperature calculation processing section 5a inverse Laplace-transforms Tcase(s) to calculate the surface temperature of the enclosure 2.

The flow of the enclosure surface temperature estimation method according to the first embodiment will be summarized.

Step S1: Measured Value Acquisition

The processor 5 disposed over the substrate 3 in the electronic apparatus 1 acquires a measured value from the temperature sensor 4.

Step S2: Enclosure Surface Temperature Calculation

On the basis of the above transfer functions G(s) and H(s) and the measured value obtained by and acquired from the temperature sensor 4, the processor 5 uses expression (3) for calculating the surface temperature of the enclosure 2.

As has been described, the processor 5 calculates the surface temperature of the enclosure 2 on the basis of the transfer functions G(s) and H(s) based on the thermal resistance and the thermal capacitance between the heat source and the surface of the enclosure 2 and the thermal resistance and the thermal capacitance between the heat source and the temperature sensor 4 on the substrate 3, respectively, and the measured value obtained by the temperature sensor 4. By doing so, time taken for heat to travel from the heat source to the surface of the enclosure 2 and from the heat source to the temperature sensor 4 on the substrate 3 is reflected in a calculation result.

For example, if the thermal time constant $\tau_G$ which depends on the magnitude of the thermal resistance and the thermal capacitance between the heat source and the surface of the enclosure 2 is greater than the thermal time constant $\tau_H$ which depends on the magnitude of the thermal resistance and the thermal capacitance between the heat source and the temperature sensor 4, then heat generated by the heat source travels more slowly to the surface of the enclosure 2 than to the temperature sensor 4.

With the method of calculating the surface temperature of the enclosure 2 by simply subtracting a fixed value from a measured value obtained by the temperature sensor 4, such information is not reflected in a calculation result. Accordingly, when the temperature of the heat source changes, a calculated value of the surface temperature of the enclosure 2 based on the measured value obtained by the temperature sensor 4 changes more rapidly than the actual surface temperature of the enclosure 2. As a result, an error occurs between the calculated value and a measured value.

With the enclosure surface temperature estimation method and the electronic apparatus according to the first embodiment, on the other hand, time taken for heat to travel is reflected in a calculation result by using the above transfer functions G(s) and H(s). As a result, followability to a change in the temperature of the heat source is improved and calculation accuracy is increased.

In addition, the surface temperature of the enclosure 2 is calculated with accuracy from a measured value obtained by the temperature sensor 4 disposed on the substrate 3. This avoids disposing a temperature sensor on the surface of the enclosure 2. As a result, the possibility that the appearance of the electronic apparatus 1 is marred becomes smaller.

Second Embodiment

Figure 2:
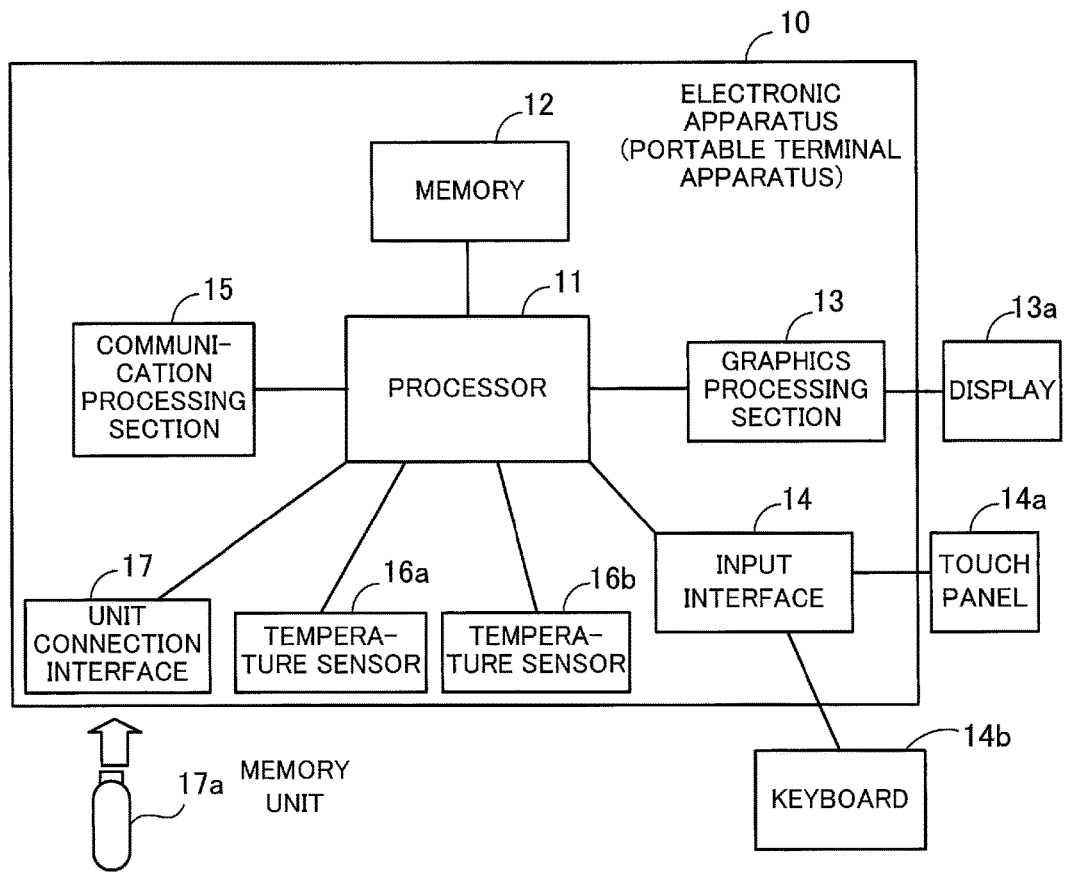
FIG. 2 illustrates an example of the hardware configuration of an electronic apparatus according to a second embodiment.

FIG. 2 illustrates an example of the hardware configuration of an electronic apparatus according to a second embodiment.

For example, an electronic apparatus 10 is a portable terminal apparatus, such as a smart phone or a tablet PC, or a computer, such as a notebook PC. However, the electronic apparatus 10 is not limited especially to them. The electronic apparatus 10 may be a desktop PC or the like.

The electronic apparatus 10 includes a processor 11, a memory 12, a graphics processing section 13, an input interface 14, a communication processing section 15, temperature sensors 16a and 16b, and a unit connection interface 17.

The processor 11 controls the whole of the electronic apparatus 10. The processor 11 may be a multiprocessor. The processor 11 is a central processing unit (CPU), a micro processing unit (MPU), a digital signal processor (DSP), an application specific integrated circuit (ASIC), a programmable logic device (PLD), or the like. Furthermore, the processor 11 may be a combination of two or more of a CPU, an MPU, a DSP, an ASIC, and a PLD.

A main heat source in the electronic apparatus 10 is the processor 11 which performs calculations, so description will now be given on the premise that a heat source is the processor 11.

The memory 12 is a flash memory, a double data rate synchronous dynamic random access memory (DDRS-DRAM), or the like. The memory 12 stores an OS program, an application program executed by the processor 101, and various pieces of data such as measured temperature data and the above heat transfer coefficient and thermal time constant.

A display 13a is connected to the graphics processing section 13. The graphics processing section 13 displays an image on a screen of the display 13a, such as a liquid crystal display, in accordance with an instruction from the processor 11.

A touch panel 14a, a keyboard 14b, or the like is connected to the input interface 14. The input interface 14 transmits to the processor 11 a signal transmitted from the touch panel 14a or the keyboard 14b.

The communication processing section 15 transmits data to and receives data from, for example, a radio base station via an antenna (not illustrated).

The temperature sensors 16a and 16b measure temperature.

The unit connection interface 17 is a communication interface used for connecting peripheral units to the electronic apparatus 10. For example, a memory unit 17a is connected to the unit connection interface 17. The memory unit 17a is a record medium having the function of communicating with the unit connection interface 17.

By adopting the above hardware configuration, processing functions in the second embodiment described in the following are realized.

The electronic apparatus 10 realizes the processing functions in the second embodiment by executing a program recorded in, for example, a computer-readable record medium. The program in which the contents of a process that is to be performed by the electronic apparatus 10 are described is recorded in various record media. For example, the program which is to be executed by the electronic apparatus 10 is stored in the memory 12. The processor 11 executes the program stored in the memory 12. The program which is to be executed by the electronic apparatus 10 may be recorded on a portable record medium, such as an optical disk or the memory unit 17a illustrated in FIG. 2. The program stored on a portable record medium is stored in the memory 12 and is then executed, under the control of, for example, the processor 11. In addition, the processor 11 may read out the program directly from a portable record medium and execute it.

An example of the disposition of the processor 11 and the temperature sensors 16a and 16b in the electronic apparatus 10 will now be described.

Figure 3:
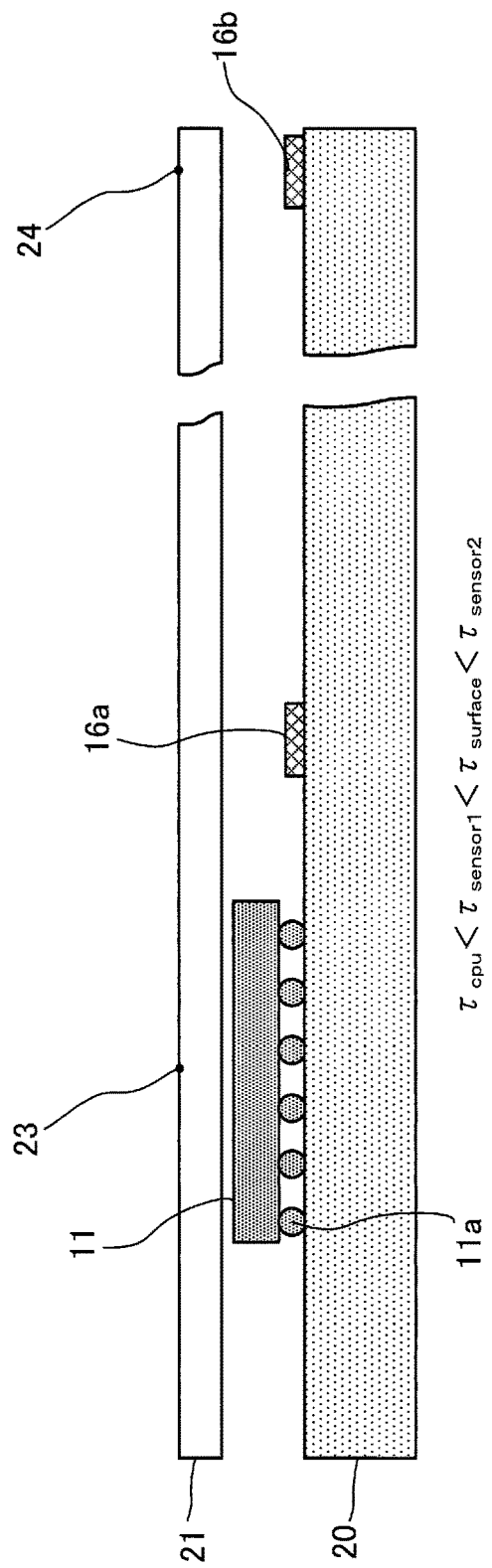
FIG. 3 illustrates an example of a section of part of the electronic apparatus according to the second embodiment.
Figure 4:
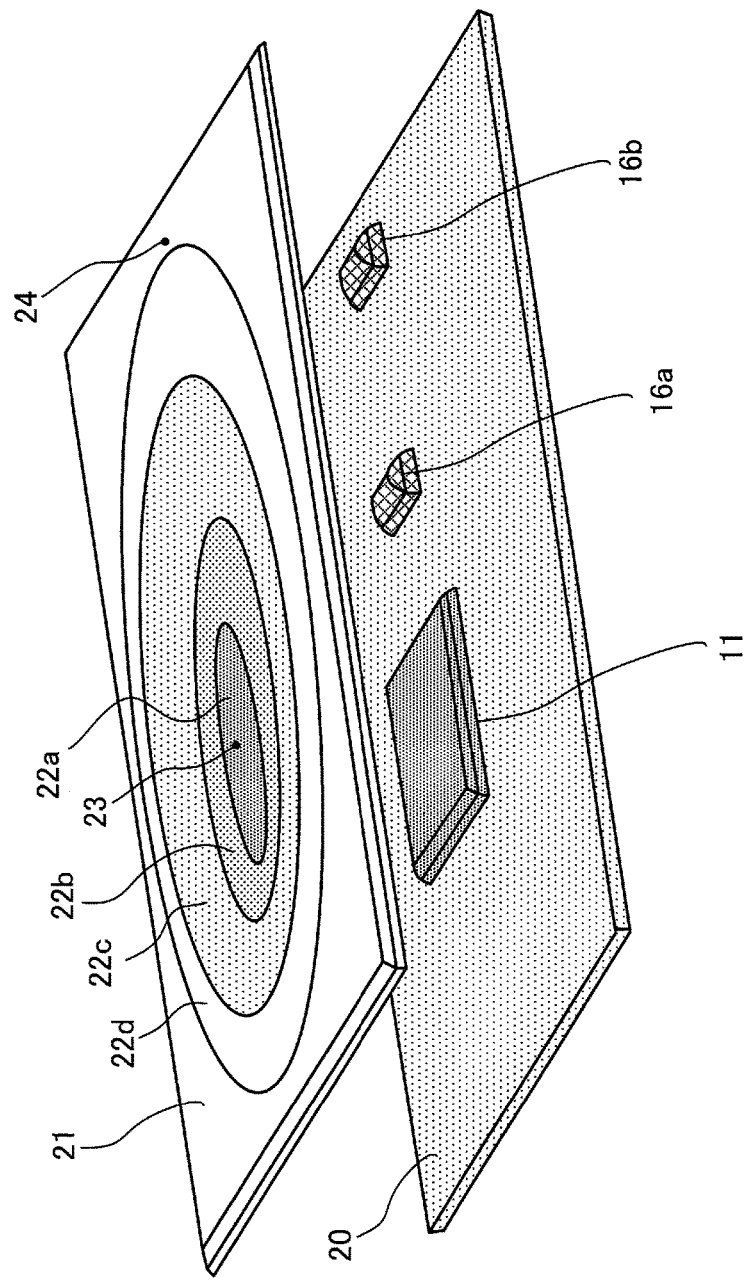
FIG. 4 is a perspective view of part of the electronic apparatus according to the second embodiment.

FIG. 3 illustrates an example of a section of part of the electronic apparatus according to the second embodiment. Furthermore, FIG. 4 is a perspective view of part of the electronic apparatus according to the second embodiment.

The processor 11 is disposed over a substrate with a bump 11a therebetween. In addition, the temperature sensors 16a and 16b are disposed on the substrate 20. In the examples of FIGS. 3 and 4, the temperature sensor 16a is disposed nearer to the processor 11 than the temperature sensor 16b.

Wirings are formed on the substrate 20 (not illustrated in FIG. 3 or 4) and the processor 11 and the temperature sensors 16a and 16b are electrically connected.

Furthermore, an enclosure 21 is disposed over the substrate 20, the processor 11, and the temperature sensors 16a and 16b. In the examples of FIGS. 3 and 4, there is a space between the processor 11 and the enclosure 21. However, the processor 11 and the enclosure 21 may be touching. The enclosure 21 is disposed so as to surround, for example, the substrate 20. However, FIGS. 3 and 4 illustrate part of the enclosure 21.

In the electronic apparatus 10 each component is disposed so that the relationships among the magnitude of thermal time constants $\tau_{cpu}$, $\tau_{surface}$, $\tau_{sensor1}$, and $\tau_{sensor2}$ of the processor 11, the enclosure 21, and the temperature sensors 16a and 16b, respectively, will be given by $$\tau_{cpu} < \tau_{sensor1} < \tau_{surface} < \tau_{sensor2}$$

The processor 11 calculates the surface temperature of the enclosure 21 on the basis of a measured value obtained by the temperature sensor 16a. Accordingly, the relationship $\tau_{sensor1} < \tau_{surface}$ is set so as to make the temperature sensor 16a more susceptible to the influence of heat generated by the heat source than the surface of the enclosure 21. Furthermore, as described later, the temperature sensor 16b is disposed for calculating reference temperature corresponding to ambient temperature around the electronic apparatus 10, so the relationships $\tau_{sensor1} < \tau_{surface} < \tau_{sensor2}$ are set so as to make the temperature sensor 16b less susceptible to the influence of heat generated by the heat source (processor 11).

In the examples of FIGS. 3 and 4, the temperature sensor 16b is disposed farther from the heat source than the temperature sensor 16a to realize $\tau_{sensor1} < \tau_{surface} < \tau_{sensor2}$. However, another method may be used. For example, an opening may be formed in the substrate 20 between the heat source and the temperature sensor 16b in order to make it difficult for heat to travel. By doing so, the above relationships among the thermal time constants are also realized.

FIG. 4 illustrates an example of temperature distribution on the surface of the enclosure 21. The temperature of an area 22a just over the processor 11, which is a heat source, is the highest. As the distance from the area 22a just over the processor 11 increases, temperature tends to fall. That is to say, temperature becomes lower in the order of areas 22b, 22c, and 22d.

The surface temperature of the enclosure 21 is calculated, for example, at a point 23 (which is detected in advance by taking measurements by the use of the electronic apparatus 10) at which temperature is the highest in the area 22a. The point 23 is not always just over the processor 11. Furthermore, hereinafter a point 24 on the surface of the enclosure 21 just over the temperature sensor 16b and temperature at the point 24 will be referred to as a temperature reference point and reference temperature Tgnd respectively. The reference temperature Tgnd corresponds to ambient temperature around the electronic apparatus 10 (hereinafter referred to as outside temperature). The reference temperature Tgnd need only be temperature corresponding to outside temperature and may not be temperature at the point 24 just over the temperature sensor 16b.

Figure 5:
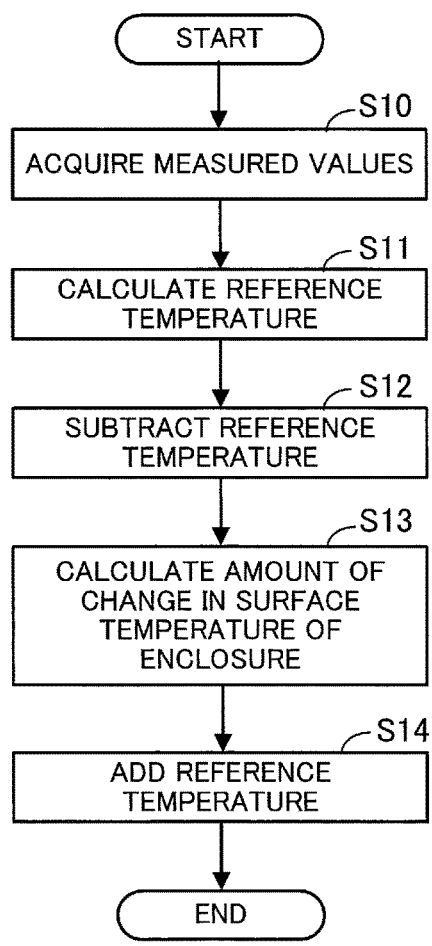
FIG. 5 is a flow chart for describing the flow of an example of an enclosure surface temperature estimation method according to the second embodiment.

FIG. 5 is a flow chart for describing the flow of an example of an enclosure surface temperature estimation method according to the second embodiment.

First the processor 11 acquires measured values obtained by the temperature sensors 16a and 16b (step S10) and calculates the reference temperature Tgnd on the basis of the measured value obtained by the temperature sensor 16b (step S11).

The reference temperature Tgnd is calculated in the following way on the basis of measurement results obtained by the use of the electronic apparatus 10.

Figure 6:
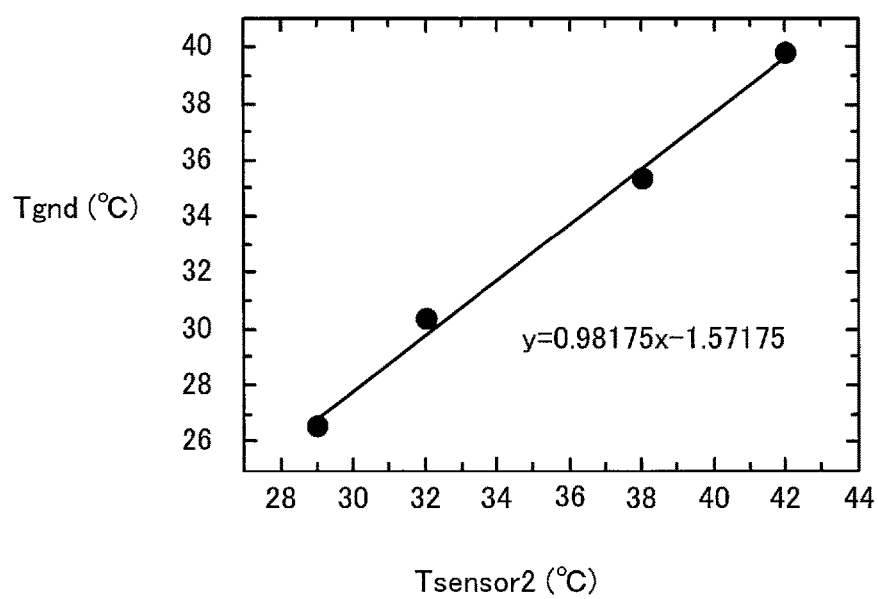
FIG. 6 illustrates an example of the relationship between reference temperature and a measured value obtained by a temperature sensor $16b$.

FIG. 6 illustrates an example of the relationship between reference temperature and a measured value obtained by the temperature sensor 16b.

In FIG. 6, a horizontal axis indicates a measured value Tsensor2 (° C.) obtained by the temperature sensor 16b and a vertical axis indicates reference temperature Tgnd (° C.).

The reference temperature Tgnd is temperature measured by the use of a thermocouple or the like at the point 24 (temperature reference point) on the surface of the enclosure 21 of the electronic apparatus 10.

It is assumed that the measured value Tsensor2 obtained by the temperature sensor 16b is x and that the reference temperature Tgnd is y. Then, as indicated in FIG. 6, the relationship y=0.98175x−1.57175 is obtained. This relationship indicates that the reference temperature Tgnd is lower by about 1.6° C. than the measured value Tsensor2 obtained by the temperature sensor 16b.

From the above relationship based on measurements taken by the use of the electronic apparatus 10, the processor 11 subtracts a fixed value (1.6° C. in the above example) on the basis of the measured value Tsensor2 obtained by the temperature sensor 16b to calculate the reference temperature Tgnd.

Next, the processor 11 subtracts the reference temperature Tgnd from a measured value Tsensor1 obtained by the temperature sensor 16a (step S12) and calculates the amount of a change in the surface temperature of the enclosure 21 from the reference temperature Tgnd on the basis of a value obtained by the subtraction (step S13).

For example, step S13 is performed in the following way.

It is assumed that a value obtained by subtracting the reference temperature Tgnd from temperature at the point 23 on the enclosure 21 which is a function of time is y(t) and that a value obtained by subtracting the reference temperature Tgnd from the measured value obtained by the temperature sensor 16a is x(t). In addition, it is assumed that values obtained by Laplace-transforming y(t) and x(t) are Y(s) and X(s) respectively (s is an operator of Laplace transform).

Like the above expression (3), at this time the relationship between Y(s) and X(s) is expressed as $$Y(s) = \{G1(s)/H1(s)\}X(s) \quad (6)$$

where $G1(s)$ is a transfer function based on thermal resistance and thermal capacitance between the processor 11, which is a heat source, and the point 23 and $H1(s)$ is a transfer function based on thermal resistance and thermal capacitance between the processor 11 and the temperature sensor 16a.

Each of the transfer functions $G1(s)$ and $H1(s)$ is calculated by the use of, for example, a thermal circuit model corresponding to a first-order low-pass filter circuit.

Figure 7:
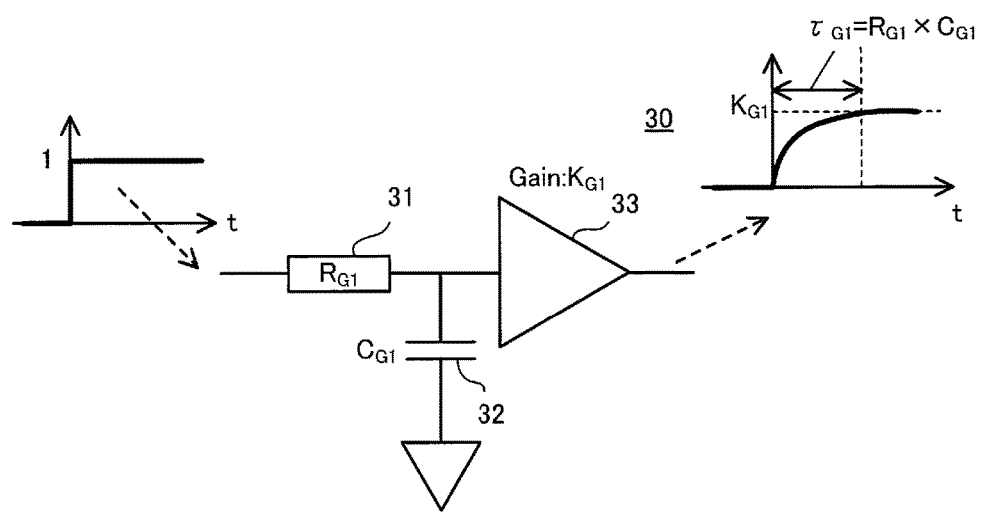
FIG. 7 illustrates an example of a thermal circuit model.

FIG. 7 illustrates an example of a thermal circuit model.

FIG. 7 illustrates an example of a thermal circuit model 30 between the processor 11 and the point 23. The thermal circuit model 30 includes a thermal resistor 31, a thermal capacitor 32, and an amplifier 33. One end of the thermal capacitor 32 and an input terminal of the amplifier 33 are connected to one end of the thermal resistor 31. The other end of the thermal capacitor 32 is grounded. A gain $K_{G1}$ of the amplifier 33 indicates a heat transfer coefficient.

When a rectangular signal with an amplitude of 1 illustrated in FIG. 7 is inputted to the other end of the thermal resistance 31, the rising of a signal outputted from an output terminal of the amplifier 33 to $K_{G1}$ is delayed for a thermal time constant $\tau_{G1}$ expressed by the product of a resistance value $R_{G1}$ of the thermal resistor 31 and a capacitance value $C_{G1}$ of the thermal capacitor 32. In the above thermal circuit model 30, the transfer function $G1(s)$ is expressed as $$G1(s) = K_{G1}/(1+s\tau_{G1}) \quad (7)$$

Similarly, the transfer function $H1(s)$ is expressed as $$H1(s) = K_{H1}/(1+s\tau_{H1}) \quad (8)$$

where $K_{H1}$ is a heat transfer coefficient between the processor 11 and the temperature sensor 16a and $\tau_{H1}$ is a thermal time constant expressed by the product of the values of thermal resistance and thermal capacitance between the processor 11 and the temperature sensor 16a.

From expressions (6) to (8), Y(s) is expressed as $$Y(s) = I(s)X(s) \quad (9)$$

$$I(s) = (K_{G1}/K_{H1})\{(1+s\tau_{H1})/(1+s\tau_{G1})\} \quad (10)$$

z-transform and a difference equation will be used in the following to simplify calculation.

When the relationship between an input signal x(nT) and an output signal y(nT) is expressed as y(nT)=i(n)x(nT) (T is a sampling period and n is a natural number), z-transform is performed and the variable z is used. By doing so, y(nT)=i(n)x(nT) is expressed as $$Y(z) = I(z)X(z)$$

When the transfer function I(s) given by expression (10) is expressed by z-transform, I(z) is expressed as $$I(z) = \frac{K_{G1}}{K_{H1}} \frac{\frac{(T+2\tau_{H1})}{(T+2\tau_{G1})} + \frac{(T-2\tau_{H1})}{(T+2\tau_{G1})}z^{-1}}{1 + \frac{(T-2\tau_{G1})}{(T+2\tau_{G1})}z^{-1}} \quad (11)$$

y(nT) is found by inverse z-transforming Y(s). By expanding y(nT) by the use of a difference equation, however, y(nT) is expressed as $$y(nT) = \sum_{i=0}^{N} a_i x(nT-iT) - \sum_{j=1}^{M} b_j y(nT-jT) \quad (12)$$

By using the transfer function I(z) given by expression (11), expression (12) is expressed further as $$y(nT) = a_0 x(nT) + a_1 x(nT-T) - b_1 y(nT-T) \quad (13)$$

where $a_0=(K_{G1}/K_{H1})\{(T+2\tau_{H1})/(T+2\tau_{G1})\}$, $a_1=(K_{G1}/K_{H1})\{(T-2\tau_{H1})/(T+2\tau_{G1})\}$, and $b_1=(T-2\tau_{G1})/(T+2\tau_{G1})$.

Figure 8:
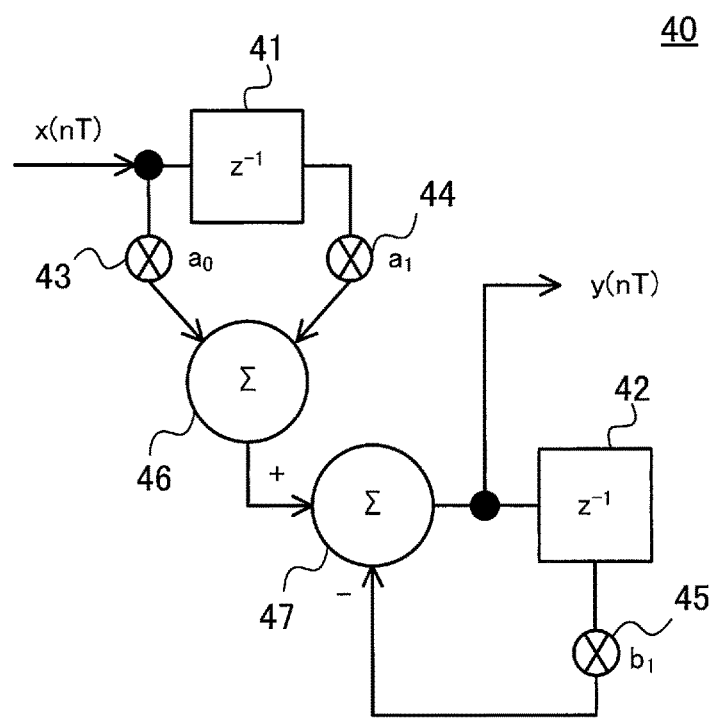
FIG. 8 illustrates an example of a calculation system which calculates expression (13)

FIG. 8 illustrates an example of a calculation system which calculates expression (13).

A calculation system 40 includes delay sections 41 and 42, multiplication sections 43, 44, and 45, and addition and subtraction sections 46 and 47.

The delay section 41 delays an input signal x(nT) for one sampling period (T).

The delay section 42 delays an output signal y(nT) for one sampling period.

The multiplication section 43 multiplies the input signal x(nT) and $a_0$ together. The multiplication section 44 multiplies a signal one sampling period before the input signal x(nT), that is to say, x(nT−T) and $a_1$ together. The multiplication section 45 multiplies a signal one sampling period before the output signal y(nT), that is to say, y(nT−T) and $b_1$ together.

The addition and subtraction section 46 adds calculation results obtained by the multiplication sections 43 and 44. The addition and subtraction section 47 subtracts a calculation result obtained by the multiplication section 45 from a calculation result obtained by the addition and subtraction section 46, and outputs the output signal y(nT).

The processor 11 performs the function of each section illustrated in FIG. 8 to calculate expression (13). To calculate expression (13), the processor 11 acquires a measured value Tsensor1 at the sampling period (T) from the temperature sensor 4, subtracts reference temperature Tgnd from the measured value Tsensor1 to obtain the value x(nT), and applies the value x(nT) to expression (13).

The values of the heat transfer coefficients $K_{G1}$ and $K_{H1}$ and the thermal time constants $\tau_{G1}$ and $\tau_{H1}$ included in $a_0$, $a_1$, and $b_1$ in expression (13) are found in advance by parameter fitting based on measured values.

Figure 9:
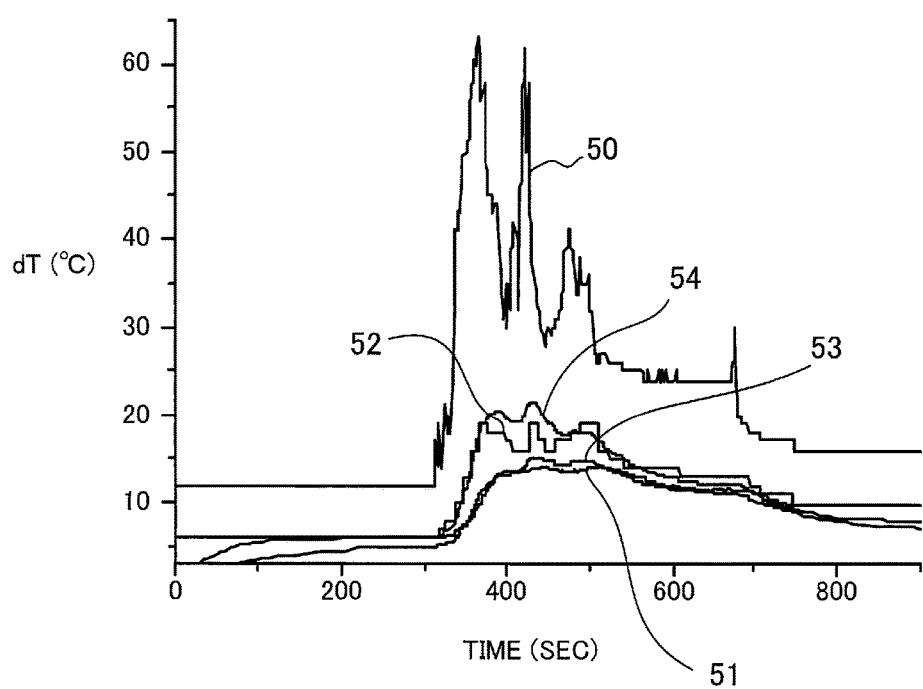
FIG. 9 illustrates an example of parameter fitting.

FIG. 9 illustrates an example of parameter fitting.

In FIG. 9, a horizontal axis indicates time (in sec) and a vertical axis indicates a temperature change dT (in ° C.). In the example of FIG. 9, a measured value of reference temperature Tgnd is 25° C.

A waveform 50 indicates a change with time in a value obtained by subtracting a measured value of reference temperature Tgnd from a measured value of the temperature of the processor 11, which is a heat source. A waveform 51 indicates a change with time in a value obtained by subtracting a measured value of the reference temperature Tgnd from a measured value of the surface temperature of the enclosure 21. The surface temperature of the enclosure 21 is measured with a thermocouple at a position at which the temperature is the highest by thermography. A waveform 52 indicates a change with time in a value obtained by subtracting a measured value of the reference temperature Tgnd from a measured value Tsensor1 obtained by the temperature sensor 16a.

A waveform 53 indicates calculation results of a change with time in a value obtained by subtracting the reference temperature Tgnd from the surface temperature of the enclosure 21.

The waveform 53 is calculated, for example, in the following way.

It is assumed that values obtained by Laplace-transforming the temperature of the processor 11 and the surface temperature of the enclosure 21 are Tcpu(s) and Tcase(s) respectively. This is the same with the first embodiment. Then Tcase(s) is expressed as $$Tcase(s)=G1(s)Tcpu(s) \quad (14)$$

The transfer function G1(s) is expressed by the above expression (7). For example, a designer makes a computer calculate expression (14) on the basis of a measured value of the temperature of the processor 11. At this time the designer makes the computer change the heat transfer coefficient $K_{G1}$ and the thermal time constant $\tau_{G1}$, which are parameters of the transfer function G1(s), so that a change with time in a value obtained by subtracting a measured value of the reference temperature Tgnd from the result of the inverse Laplace transform of Tcase(s) will approach the waveform 51. The waveform 53 is obtained by such parameter fitting.

A waveform 54 indicates calculation results of a change with time in a value obtained by subtracting the reference temperature Tgnd from the measured value Tsensor1 obtained by the temperature sensor 16a.

The waveform 54 is calculated, for example, in the following way.

It is assumed that a value obtained by Laplace-transforming the measured value Tsensor1 obtained by the temperature sensor 16a is Tsensor1(s). Then Tsensor1(s) is expressed as $$Tsensor1(s)=H1(s)Tcpu(s) \quad (15)$$

The transfer function H1(s) is expressed by the above expression (8). For example, the designer makes the computer calculate expression (15) on the basis of the measured value of the temperature of the processor 11. At this time the designer makes the computer change the heat transfer coefficient $K_{H1}$ and the thermal time constant $\tau_{H1}$, which are parameters of the transfer function H1(s), so that a change with time in a value obtained by subtracting the reference temperature Tgnd from the result of the inverse Laplace transform of Tsensor1(s) will approach the waveform 52. The waveform 54 is obtained by such parameter fitting.

There is no need for the waveforms 53 and 54 to completely match the waveforms 51 and 52 respectively. For example, if each of the waveforms 53 and 54 is in the range of a determined error, then calculation time and the like are taken into consideration and the waveforms 53 and are considered to match the waveforms 51 and 52 respectively.

In the example of FIG. 9, parameter values obtained by parameter fitting are $K_{G1}$=0.425, $K_{H1}$=0.500, $\tau_{G1}$=85, and $\tau_{H1}$=40.

For example, parameter values are stored in the memory 12 of the electronic apparatus 10. When the processor 11 calculates expression (13), the parameter values are read out and are used.

When the above step S13 ends, the processor 11 adds the reference temperature Tgnd to the amount of a change in the surface temperature of the enclosure 21 (value obtained by subtracting the reference temperature Tgnd from temperature at the point 23 on the enclosure 21) calculated in step S13 (step S14). By doing so, the surface temperature of the enclosure 21 is found. After that, for example, the processor 11 may perform operation to reduce power consumption when a calculated surface temperature is higher than a determined value (not illustrated). In addition, the processor 11 may control the graphics processing section 13 to display a message on the display 13a for calling a user's attention.

Figure 10:
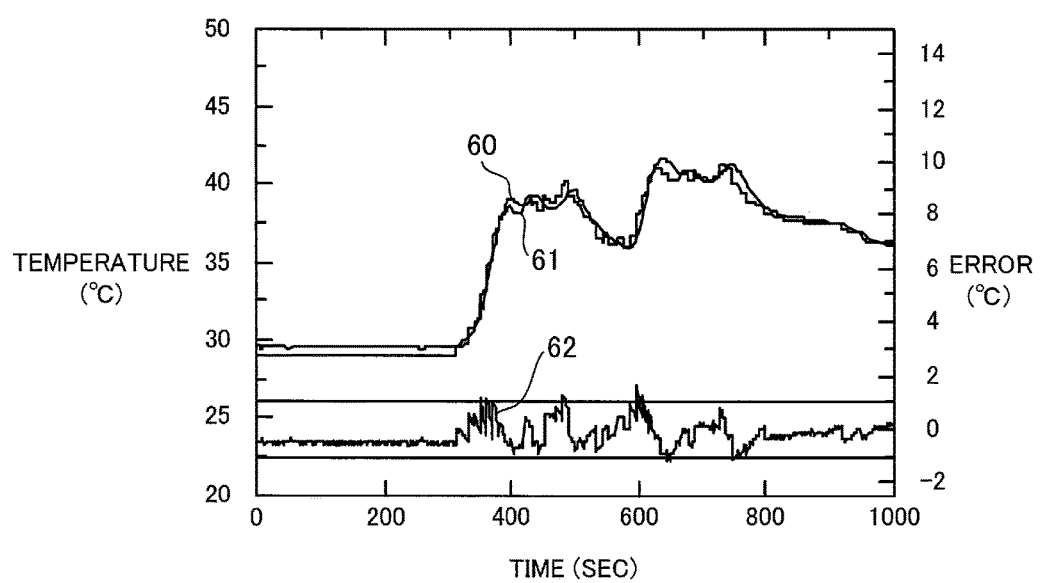
FIG. 10 illustrates calculation results of the surface temperature of an enclosure.

FIG. 10 illustrates calculation results of the surface temperature of the enclosure.

In FIG. 10, a horizontal axis indicates time (in sec), a left vertical axis indicates temperature (in ° C.), and a right vertical axis indicates an error (in ° C.).

A waveform 60 indicates measured values of the surface temperature of the enclosure 21 (temperature at the point 23 on the enclosure 21). A waveform 61 indicates values calculated on the basis of expression (13).

Furthermore, a waveform 62 indicates the difference (error) between the measured values and the values calculated on the basis of expression (13).

As can be seen from FIG. 10, the surface temperature of the enclosure 21 can be estimated with an error of about 1° C. or less.

As has been described, the processor 11 calculates the surface temperature of the enclosure 21 by the use of the transfer functions G1(s) and H1(s) based on thermal resistance and thermal capacitance, so time taken for heat to travel is reflected in a calculation result. As a result, followability to a change in the temperature of the heat source is improved and calculation accuracy is increased.

In addition, the processor 11 subtracts the reference temperature Tgnd from a measured value obtained by the temperature sensor 16a, calculates the amount of a change in the surface temperature of the enclosure 21 by the use of the above transfer functions G1(s) and H1(s) from the amount of a change in the measured value, and adds the reference temperature Tgnd. By doing so, the transfer functions G1(s) and H1(s) based on parameters obtained by parameter fitting based on each measured value from which reference temperature corresponding to outside temperature has been subtracted are applied. The transfer functions G1(s) and H1(s) reflect a change in the temperature of the heat source more accurately, so a change in the surface temperature of the enclosure 21 corresponding to a change in the temperature of the heat source is calculated with greater accuracy from a measured value obtained by the temperature sensor 16a.

Moreover, the processor 11 performs a calculation, such as expression (13), using z-transform and a difference equation, and calculates the amount of a change in the surface temperature of the enclosure 21. This reduces the number of times a calculation is performed.

Furthermore, the surface temperature of the enclosure 21 is calculated accurately from measured values obtained by the temperature sensors 16a and 16b disposed on the substrate 20. This avoids disposing a temperature sensor on the surface of the enclosure 21. As a result, the possibility that the appearance of the electronic apparatus 1 is marred becomes smaller. In addition, if a temperature sensor is disposed on the surface of the enclosure 21, then a cable or the like which connects the temperature sensor and the substrate 20 will be used. This increases the costs. With the electronic apparatus 10 according to the second embodiment, however, the temperature sensors 16a and 16b are disposed on the substrate 20. This checks an increase in the costs.

Third Embodiment

An enclosure surface temperature estimation method according to a third embodiment will now be described.

If a time constant of a temperature change detected by the temperature sensor 16a is greater than the thermal time constant $\tau_{sensor1}$, then the processor 11 may calculate the surface temperature of the enclosure 21 by the use of a thermal circuit model not including a thermal capacitor.

Figure 11:
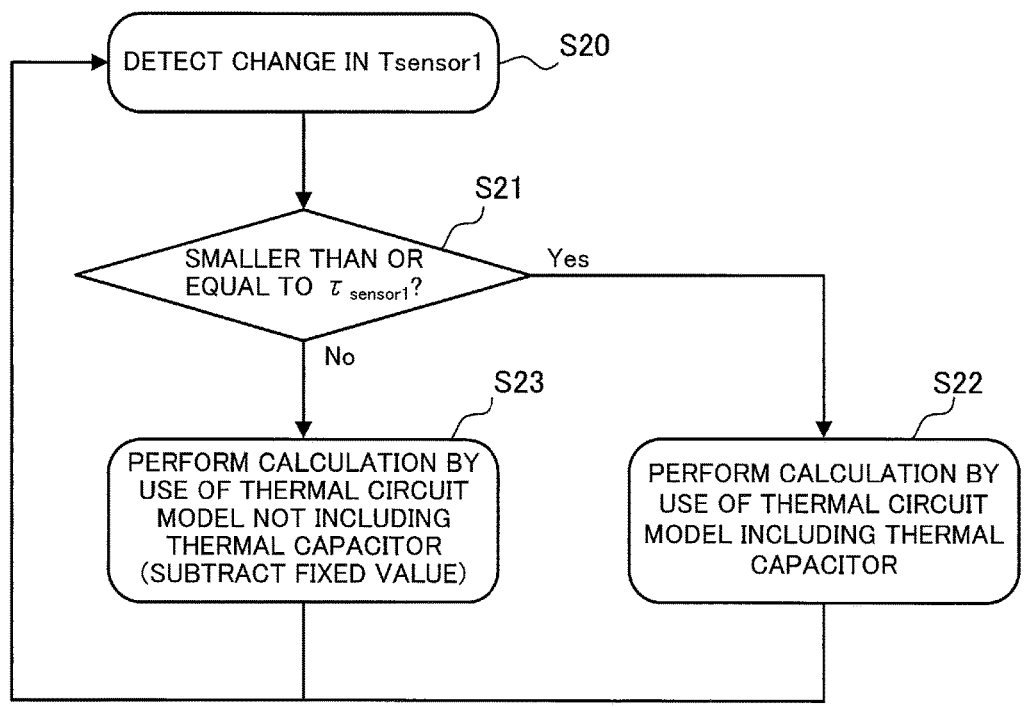
FIG. 11 illustrates the flow of an example of a surface temperature estimation algorithm corresponding to a time constant of a temperature change.

FIG. 11 illustrates the flow of an example of a surface temperature estimation algorithm corresponding to a time constant of a temperature change.

When the processor 11 detects a change in the measured value Tsensor1 obtained by the temperature sensor 16a (step S20), the processor 11 determines whether or not a time constant of the change is smaller than or equal to the thermal time constant $\tau_{sensor1}$ (step S21). If the time constant of the change in the measured value Tsensor1 is smaller than or equal to the thermal time constant $\tau_{sensor1}$, then the processor 11 calculates the surface temperature of the enclosure 21 in the above way by the use of a thermal circuit model (see FIG. 7) including a thermal capacitor (step S22).

On the other hand, if the time constant of the change in the measured value Tsensor1 is greater than the thermal time constant $\tau_{sensor1}$, then the processor 11 calculates the surface temperature of the enclosure 21 by the use of a thermal circuit model not including a thermal capacitor (step S23). A thermal circuit model not including a thermal capacitor is based on a thermal resistor. The processor 11 calculates the surface temperature of the enclosure 21 by subtracting a determined fixed value from a measured value obtained by the temperature sensor 16a. For example, the determined fixed value is found in advance by actual measurement and is stored in the memory 12.

If a change in the temperature of the heat source is comparatively slow, the surface temperature of the enclosure 21 is calculated with comparative accuracy without considering time taken for heat to travel. Accordingly, the use of the above thermal circuit model not including a thermal capacitor reduces the number of times a calculation is performed.

Fourth Embodiment

An enclosure surface temperature estimation method according to a fourth embodiment will now be described.

On the basis of the magnitude (absolute value) of a temperature change per unit time detected by the temperature sensor 16a, the processor 11 may switch a thermal circuit model used for calculating the surface temperature of the enclosure 21.

Figure 12:
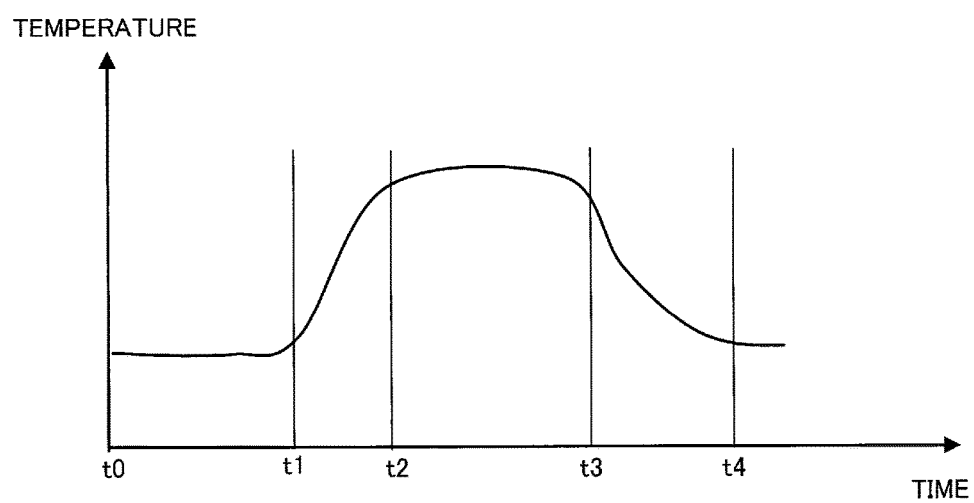
FIG. 12 illustrates an example of a temperature change detected by a temperature sensor $16a$.

FIG. 12 illustrates an example of a temperature change detected by the temperature sensor 16a.

In FIG. 12, a horizontal axis indicates time and a vertical axis indicates temperature detected by the temperature sensor 16a.

For example, a temperature change per unit time is small from time t0 to t1, from time t2 to t3, and from time t4 on, so the processor 11 calculates the surface temperature of the enclosure 21 by the use of a thermal circuit model not including a thermal capacitor. In addition, a temperature change per unit time is great from the time t1 to t2 and from the time t3 to t4, so the processor 11 calculates the surface temperature of the enclosure 21 by the use of a thermal circuit model including a thermal capacitor (thermal circuit model expressed by the above transfer functions).

A threshold for changing a thermal circuit model to be used by the processor 11 is calculated, for example, in the following way.

It is assumed that a temperature change per unit time is constant and that the surface temperature of the enclosure 21 calculated by the use of a thermal circuit model expressed by transfer functions is Tramp(t). Then Tramp(t) is expressed, by the use of expressions (3) to (5) and a ramp function, as $$\text{Tramp}(t) = \mathcal{L}^{-1}\left[\alpha \frac{1+s\tau_H}{1+s\tau_G} \frac{1}{s^2}\right] \quad (16)$$

where $1/s^2$ is obtained by Laplace-transforming a unit ramp function and $\alpha = K_G/K_H$.

The difference ra between a measured value obtained by the temperature sensor 16a in the case of a change per second in temperature detected by the temperature sensor 16a being d° C./sec and the surface temperature of the enclosure 21 calculated by the use of the thermal circuit model expressed by the transfer functions is expressed as $$ra = dt - \text{Tramp}(t) = ad\left[(\tau_G - \tau_H) + e^{-\frac{t}{\tau_G}}(\tau_G - \tau_H)\right] \quad (17)$$

The surface temperature of the enclosure 21 calculated by the use of a thermal circuit model not including a thermal capacitor is obtained by subtracting a determined fixed value from a measured value obtained by the temperature sensor 16a, so the difference ra given by expression (17) reflects an error produced at the time of calculating the surface temperature of the enclosure 21 by the use of both of the thermal circuit models.

Hereinafter it is assumed that when a temperature change is d, in which difference ra≤r0 (=1° C., for example), the processor 11 determines that an error produced at the time of calculating the surface temperature of the enclosure 21 by the use of both of the thermal circuit models is small and that the processor 11 calculates the surface temperature of the enclosure 21 by the use of the thermal circuit model not including a thermal capacitor.

It is assumed that when t in expression (17) is set to infinity and the following expression (18) holds, ra≤r0.

$$d \leq r0/\{\alpha(\tau_G - \tau_H)\} \quad (18)$$

Figure 13:
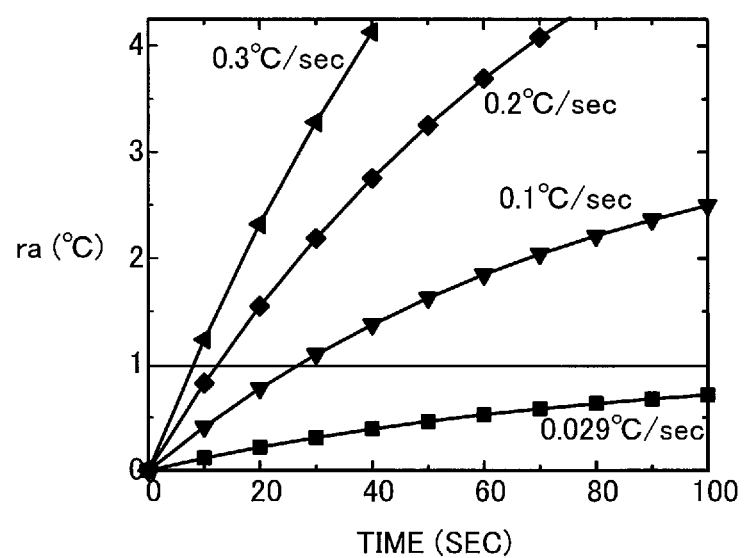
FIG. 13 illustrates an example of calculation results of the relationship between a temperature change per second detected by the temperature sensor $16a$ and a change in the difference ra with time.

FIG. 13 illustrates an example of calculation results of the relationship between a temperature change per second detected by the temperature sensor 16a and a change in the difference ra with time.

In the examples of FIG. 13, $\alpha$, $\tau_H$, and $\tau_G$ in expression (17) are set to 1, 45, and 80 respectively. In FIG. 13, a horizontal axis indicates time (in sec) and a vertical axis indicates the difference ra (in ° C.).

FIG. 13 also illustrates a change in the difference ra with time at the time of a temperature change d being 0.3, 0.2, 0.1, and 0.029° C./sec.

As can be seen from FIG. 13, for example, if r0=1° C. in expression (18) and a temperature change d is smaller than or equal to 1/(80−45)(=0.029° C./sec), then ra≤1° C.

As has been described, when a temperature change increases (not only when the temperature rises but also when the temperature falls), the processor 11 may use the right side of expression (18) as a threshold for changing a thermal circuit model to be used from the thermal circuit model not including a thermal capacitor to the thermal circuit model including a thermal capacitor. r0 can be changed properly according to an allowable error, so a calculation method can be switched according to the allowable error.

On the other hand, when a temperature change decreases, a threshold for changing a thermal circuit model to be used to the thermal circuit model not including a thermal capacitor is calculated, for example, in the following way.

It is assumed that a temperature change detected by the temperature sensor 16a exhibits a step response characteristic. At this time it is assumed that the surface temperature of the enclosure 21 calculated by the use of a thermal circuit model expressed by transfer functions is Tstep(t). Then Tstep(t) is expressed, by the use of expressions (3) to (5) and a step function, as $$T\text{step}(t) = \mathcal{L}^{-1}\left[\alpha \frac{1 + s\tau_H}{1 + s\tau_G} \frac{1}{s}\right] \quad (19)$$

$$= \alpha\left[1 - \frac{e^{-\frac{t}{\tau_G}}(\tau_G - \tau_H)}{\tau_G}\right]$$

where 1/s is obtained by Laplace-transforming a unit step function and $\alpha = K_G/K_H$.

The difference rb between a measured value (=1° C.) obtained by the temperature sensor 16a after a change based on the step response characteristic and the surface temperature of the enclosure 21 calculated by the use of the thermal circuit model expressed by the transfer functions is expressed as $$rb = 1 - T\text{step}(t) \quad (20)$$

The surface temperature of the enclosure 21 calculated by the use of a thermal circuit model not including a thermal capacitor is obtained by subtracting a determined fixed value from a measured value obtained by the temperature sensor 16a, so the difference rb given by expression (20) reflects an error produced at the time of calculating the surface temperature of the enclosure 21 by the use of both of the thermal circuit models.

Hereinafter it is assumed that at time ta, at which difference rb=r1, the processor 11 determines that an error produced at the time of calculating the surface temperature of the enclosure 21 by the use of both of the thermal circuit models is small and that the processor 11 calculates the surface temperature of the enclosure 21 by the use of the thermal circuit model not including a thermal capacitor. r1 may be the same as the above r0. The time ta at which difference rb=r1 is given by $$ta = \tau_G \ln\left[\frac{\tau_G - \tau_H}{\left(1 - \frac{r1}{\alpha}\right)\tau_G}\right] \quad (21)$$

Figure 14:
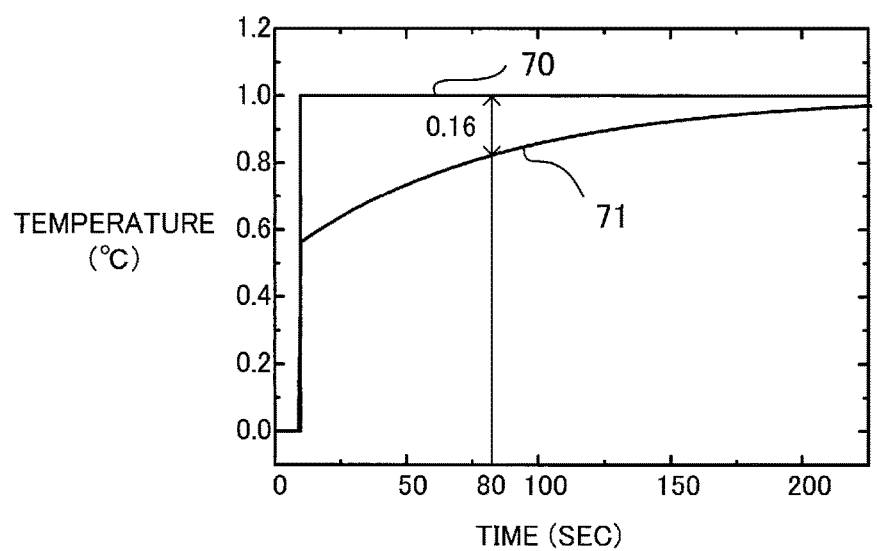
FIG. 14 illustrates an example of temperature detected by the temperature sensor $16a$ and calculation results of a change in the surface temperature of an enclosure with time calculated by the use of a thermal circuit model including a thermal capacitor.

FIG. 14 illustrates an example of temperature detected by the temperature sensor 16a and calculation results of a change in the surface temperature of the enclosure with time calculated by the use of the thermal circuit model including a thermal capacitor.

In the examples of FIG. 14, $\alpha$, $\tau_H$, and $\tau_G$ in expression (19) are set to 1, 45, and 80 respectively. In FIG. 14, a horizontal axis indicates time (in sec) and a vertical axis indicates temperature (in ° C.).

Furthermore, a waveform 70 indicates a change with time in temperature detected by the temperature sensor 16a (unit step response). A waveform 71 indicates a change with time in the surface temperature of the enclosure 21 calculated by the use of the thermal circuit model including a thermal capacitor.

For example, if r1=0.16° C. in expression (21), then time ta=80 sec.

When the time ta has elapsed since the magnitude of a change per unit time in temperature detected by the temperature sensor 16a becomes smaller than or equal to a value (=±R in the following), the processor 11 changes a thermal circuit model to be used from the thermal circuit model including a thermal capacitor to the thermal circuit model not including a thermal capacitor. That is to say, the processor 11 may use the time ta as a threshold for changing a thermal circuit model to be used from the thermal circuit model including a thermal capacitor to the thermal circuit model not including a thermal capacitor.

r1 can be changed properly according to an allowable error, so a calculation method can be switched according to the allowable error.

The flow of an example of a surface temperature estimation algorithm using each of the above thresholds will be summarized in the following.

Figure 15:
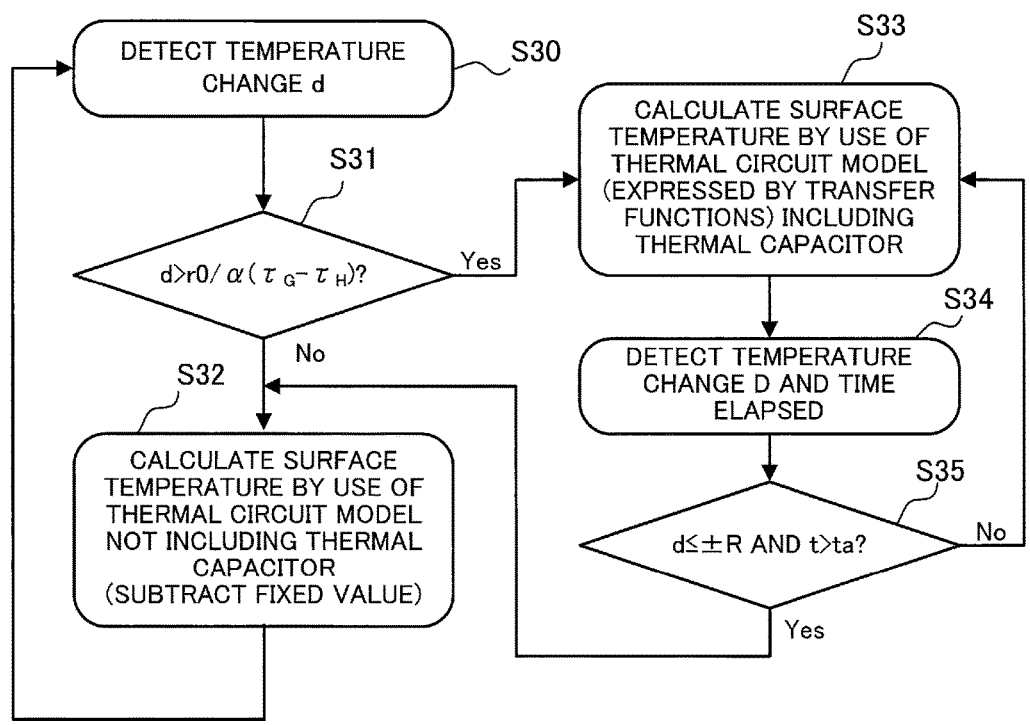
FIG. 15 illustrates the flow of an example of a surface temperature estimation algorithm corresponding to the magnitude of a temperature change.

FIG. 15 illustrates the flow of an example of a surface temperature estimation algorithm corresponding to the magnitude of a temperature change.

The processor 11 detects a temperature change d detected by the temperature sensor 16a (step S30) and determined whether or not $d > r0/\alpha(\tau_G - \tau_H)$ (step S31).

When $d > r0/\alpha(\tau_G - \tau_H)$ does not hold, then the processor 11 calculates the surface temperature of the enclosure 21 by the use of a thermal circuit model not including a thermal capacitor (step S32). The thermal circuit model not including a thermal capacitor is based on a thermal resistor and the processor 11 calculates the surface temperature of the enclosure 21 by subtracting a determined fixed value from a measured value obtained by the temperature sensor 16a. For example, the determined fixed value is found in advance by actual measurement and is stored in the memory 12. After step S32, the process is repeated from step S30.

On the other hand, when $d > r0/\alpha(\tau_G - \tau_H)$ holds, then the processor 11 calculates the surface temperature of the enclosure 21 in the above way by the use of a thermal circuit model (expressed by transfer functions) including a thermal capacitor (step S33). The processor 11 then detects a temperature change d and time elapsed (step S34) and determines whether or not time t which have elapsed since the temperature change d became ±R is longer than time ta given by expression (21) (step S35). If the time t which have elapsed since the temperature change d became ±R is longer than the time ta, then step S32 is performed. If the temperature change d does not become ±R or if the time t which have elapsed since the temperature change d became ±R is shorter than or equal to the time ta, then the process is repeated from step S33.

As has been described, the processor 11 switches a thermal circuit model to be used on the basis of a temperature change detected by the temperature sensor 16a. As a result, when the difference in calculation accuracy between both of the thermal circuit models is small, there is no need to use the thermal circuit model including a thermal capacitor, either. This makes it possible to reduce the number of times a calculation is performed while, while maintaining accuracy.

Fifth Embodiment

An enclosure surface temperature estimation method according to a fifth embodiment will now be described.

The processor 11 may detect the operation of the electronic apparatus 10 by a user and switch, on the basis of time for which the user operates the electronic apparatus 10, a thermal circuit model used for calculating the surface temperature of the enclosure 21.

Figure 16:
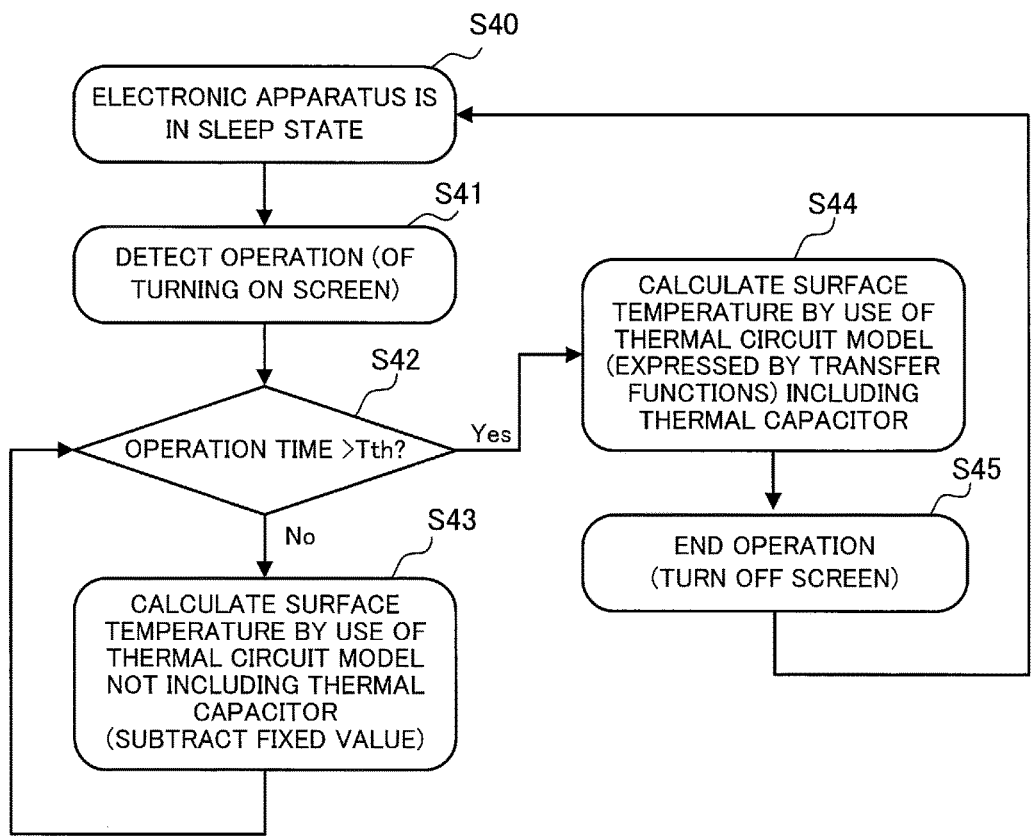
FIG. 16 illustrates the flow of an example of a surface temperature estimation algorithm based on time for which a user operates the electronic apparatus.

FIG. 16 illustrates the flow of an example of a surface temperature estimation algorithm based on time for which a user operates the electronic apparatus.

When the electronic apparatus 10 is in a sleep state (step S40) and the processor 11 detects the operation of the electronic apparatus 10 (operation of turning on a screen, for example) by a user (step S41), the processor 11 performs step S42.

In step S42, the processor 11 determines whether or not time for which the user operates the electronic apparatus 10 (time for which the user operates the touch panel 14a, for example) is longer than a threshold Tth.

If the time for which the user operates the electronic apparatus 10 is shorter than or equal to the threshold Tth, then the processor 11 calculates the surface temperature of the enclosure 21 by the use of a thermal circuit model not including a thermal capacitor (step S43).

For example, the threshold Tth is set on the basis of a thermal time constant $\tau_G$. For example, if Tth=$\tau_G$/2, then fluctuations in the surface temperature of the enclosure 21 caused by heat generated by the processor 11 are comparatively small. Accordingly, the difference in calculation accuracy between the thermal circuit model not including a thermal capacitor and a thermal circuit model including a thermal capacitor is small. If an allowable error is smaller, then the threshold Tth may be set to a smaller value.

After that, the process is repeated from step S42.

If the time for which the user operates the electronic apparatus 10 is longer than the threshold Tth, then the processor 11 calculates the surface temperature of the enclosure 21 by the use of the thermal circuit model (expressed by transfer functions) including a thermal capacitor (step S44). When after that the user ends the operation of the electronic apparatus 10 (for example, when the user performs the operation of turning off the screen) (step S45), the process is repeated from step S40.

As has been described, in this embodiment the processor 11 switches a thermal circuit model to be used on the basis of the result of a comparison between time for which the user operates the electronic apparatus 10 and a threshold. As a result, when the difference in calculation accuracy between both of the thermal circuit models is small, there is no need to use the thermal circuit model including a thermal capacitor, either. This makes it possible to reduce the number of times a calculation is performed while, while maintaining accuracy.

Sixth Embodiment

An enclosure surface temperature estimation method according to a sixth embodiment will now be described.

On the basis of the number of times a user operates the electronic apparatus 10 per unit time, the processor 11 may switch a thermal circuit model used for calculating the surface temperature of the enclosure 21.

Figure 17:
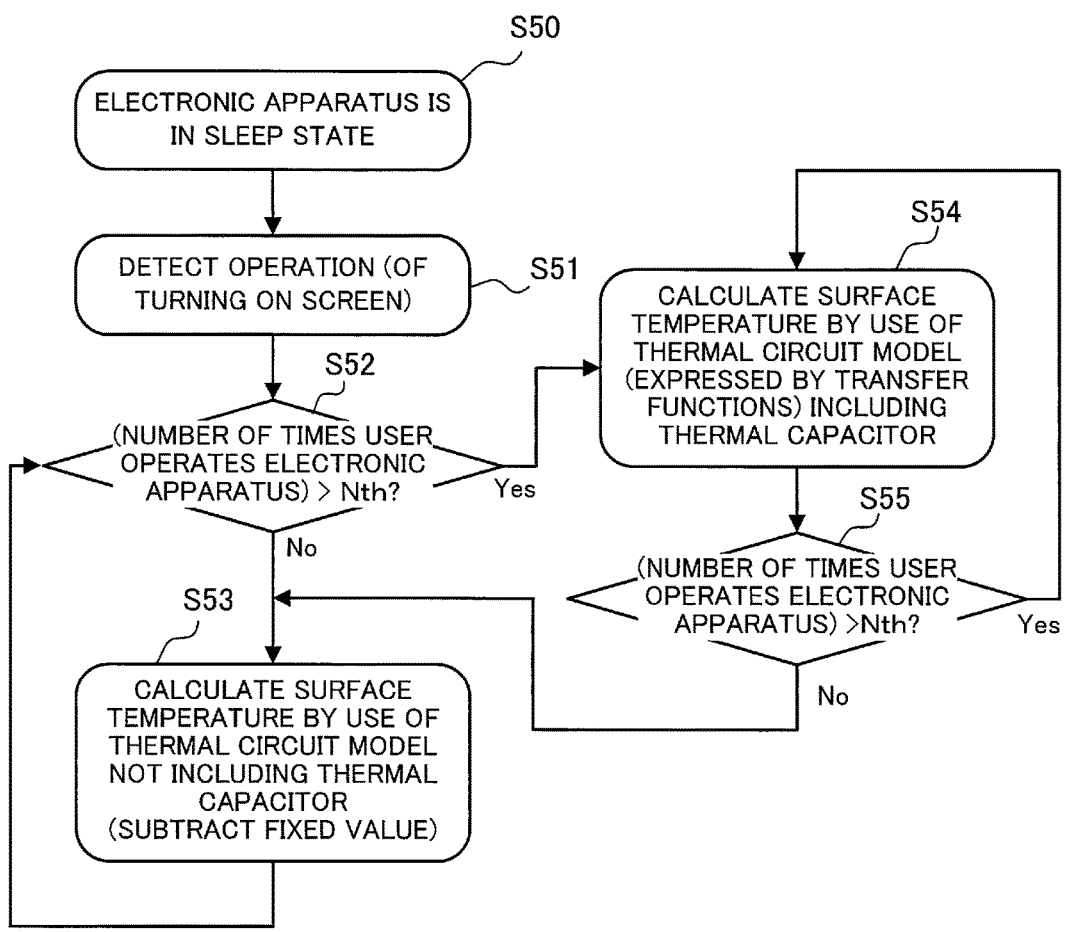
FIG. 17 illustrates the flow of an example of a surface temperature estimation algorithm based on the number of times a user operates the electronic apparatus per unit time.

FIG. 17 illustrates the flow of an example of a surface temperature estimation algorithm based on the number of times a user operates the electronic apparatus per unit time.

Steps S50 and S51 are the same as steps S40 and S41, respectively, illustrated in FIG. 16. After step S51, the processor 11 determines whether or not the number of times the user operates the electronic apparatus 10 per unit time is greater than a threshold Nth (step S52).

If the number of times the user operates the electronic apparatus 10 per unit time is smaller than or equal to the threshold Nth, then the processor 11 calculates the surface temperature of the enclosure 21 by the use of a thermal circuit model not including a thermal capacitor (step S53).

For example, the threshold Nth is set according to an allowable error (difference between surface temperatures calculated by the use of both of the thermal circuit model not including a thermal capacitor and a thermal circuit model including a thermal capacitor) by doing a simulation in advance. For example, if an error is within a tolerance range when the number of times the user operates the electronic apparatus 10 is ten or less in 10 seconds, then that value (10 times/10 seconds) is applied as the threshold Nth.

After that, step S52 is repeated.

If the number of times the user operates the electronic apparatus 10 per unit time is greater than the threshold Nth, then the processor 11 calculates the surface temperature of the enclosure 21 by the use of the thermal circuit model (expressed by transfer functions) including a thermal capacitor (step S54). Furthermore, the processor 11 makes a determination which is the same as step S52 (step S55). If the number of times the user operates the electronic apparatus 10 per unit time is greater than the threshold Nth, then the processor 11 repeats step S54. If the number of times the user operates the electronic apparatus 10 per unit time is smaller than or equal to the threshold Nth, then the processor 11 performs step S53.

As has been described, in this embodiment the processor 11 switches a thermal circuit model to be used on the basis of the result of a comparison between the number of times the user operates the electronic apparatus 10 per unit time and a threshold. As a result, when an error between calculation results obtained by the use of the thermal circuit model including a thermal capacitor and the thermal circuit model not including a thermal capacitor is comparatively small, there is no need to use the thermal circuit model including a thermal capacitor, either. This makes it possible to reduce the number of times a calculation is performed, while maintaining accuracy.

By the way, in the above descriptions the transfer functions are expressed by expressions (4) and (5) or expressions (7) and (8) by the use of the thermal circuit model corresponding to a first-order low-pass filter circuit. However, transfer functions may be expressed by the use of a thermal circuit model corresponding to a second-order low-pass filter circuit, a third-order low-pass filter circuit, or the like.

Figure 18:
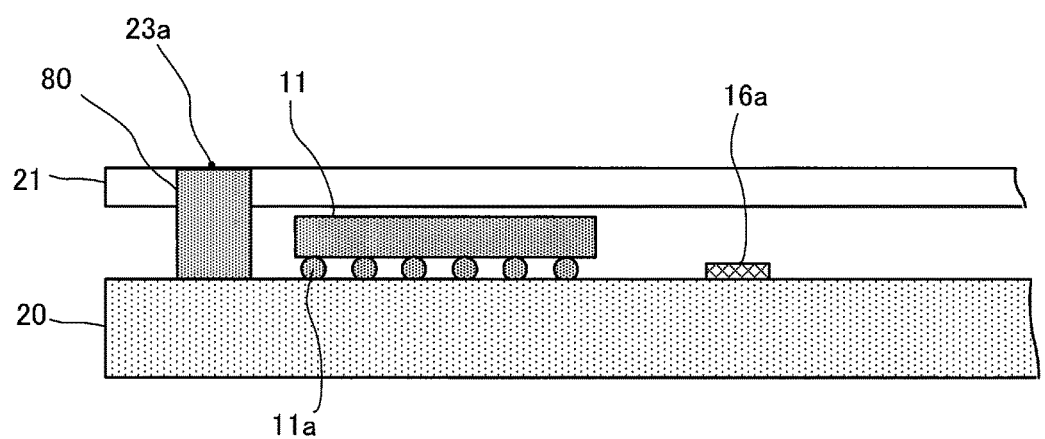
FIG. 18 illustrates an example of a section of part of an electronic apparatus for describing a thermal circuit model corresponding to a second-order low-pass filter.

FIG. 18 illustrates an example of a section of part of an electronic apparatus for describing a thermal circuit model corresponding to a second-order low-pass filter.

Components in FIG. 18 which are the same as those illustrated in FIG. 3 are marked with the same numerals.

It is assumed that heat generated by a processor 11 travels to a point 23a on the surface of an enclosure 21 via a substrate 20 and a sensor 80. Then, for example, the transfer function G(s) expressed by expression (4) is rewritten as $$G(s) = K_G \frac{1}{1+s\tau_{Ga}} \cdot \frac{1}{1+s\tau_{Gb}} \quad (22)$$

where $\tau_{Ga}$ is expressed by the product of the values of the thermal resistance and the thermal capacitance of the substrate 20 between the processor 11 and the point 23a and $\tau_{Gb}$ is expressed by the product of the values of the thermal resistance and the thermal capacitance of the sensor 80 between the processor 11 and the point 23a.

It is assumed that a transfer function H(s) is expressed by expression (5). Then temperature Tcase at the point 23a is expressed, for example, as $$Tcase(s) = \frac{G(s)}{H(s)} Tsensor(s) = \frac{K_G}{K_H} \frac{1+s\tau_H}{(1+s\tau_{Ga})(1+s\tau_{Gb})} Tsensor(s) \quad (23)$$

Furthermore, by using the above z-transform and difference equation, an output signal y(nT) corresponding to the temperature Tcase is expressed as $$y(nT)=a_0x(nT)+a_1x(nT-T)+a_2x(nT-2T)-\{b_1y(nT-T)+b_2y(nT-2T)\} \quad (24)$$

If $bb=4\tau_{Ga}\tau_{Gb}+2T(\tau_{Ga}+\tau_{Gb})+T^2$, then in expression (24) $a_0=\alpha(2T\tau_H+T^2)/bb$, $a_1=2\alpha T^2/bb$, $a_2=\alpha(-2T\tau_H+T^2)/bb$, $b_1=(-8\tau_{Ga}\tau_{Gb}+2T^2)/bb$, and $b_2=(4\tau_{Ga}\tau_{Gb}-2T(\tau_{Ga}+\tau_{Gb})+T^2)/bb$.

As has been described, if the thermal circuit model corresponding to a second-order low-pass filter is used, calculation accuracy is increased. However, the number of times a calculation is performed increases. Accordingly, it is more desirable to use the methods according to the third to sixth embodiments which can reduce the number of times a calculation is performed.

The methods according to the above embodiments may be combined.

The aspects of the enclosure surface temperature estimation method and the electronic apparatus according to the present invention have been described on the basis of the embodiments. However, these are simple examples and the present invention is not limited to the above descriptions.

In the above descriptions, for example, one temperature sensor 16b is used for finding the reference temperature Tgnd. However, plural temperature sensors 16b may be used. That is to say, the processor 11 may calculate reference temperature Tgnd on the basis of measured values obtained by the plural temperature sensors 16b.

Furthermore, the processor 11 may include, for example, a CPU and a DSP. It is assumed that the CPU is a heat source, and the DSP may calculate the surface temperature of the enclosure 21.

In addition, the processor 11 may calculate the surface temperature of the enclosure 21 in the following way. If time for which the processor 11 operates per unit time is longer than a certain value, then the processor 11 calculates the surface temperature of the enclosure 21 by the use of a thermal circuit model including a thermal capacitor. If time for which the processor 11 operates per unit time is shorter than or equal to the certain value, then the processor 11 calculates the surface temperature of the enclosure 21 by the use of a thermal circuit model not including a thermal capacitor.

Moreover, the processor 11 may calculate the surface temperature of the enclosure 21 in the following way. If an application which consumes comparatively much power is started, then the processor 11 calculates the surface temperature of the enclosure 21 by the use of a thermal circuit model including a thermal capacitor. If an application which consumes little power is started, then the processor 11 calculates the surface temperature of the enclosure 21 by the use of a thermal circuit model not including a thermal capacitor.

According to the disclosed enclosure surface temperature estimation method and electronic apparatus, the surface temperature of an enclosure is calculated with accuracy.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An enclosure surface temperature estimation method for estimating an estimate surface temperature of an enclosure of an electronic apparatus that includes the enclosure, a substrate of the electronic apparatus, a processor disposed over the substrate, a first temperature sensor disposed on the substrate, a second temperature sensor disposed on the substrate, and a memory, comprising:
   acquiring, by the processor, a first measured value from the first temperature sensor that is electrically connected to the processor;
   acquiring, by the processor, a second measured value from the second temperature sensor that is electrically connected to the processor and disposed on the substrate such that a thermal time constant of the second temperature sensor is greater than a thermal time constant of the first temperature sensor and a thermal time constant of the surface of the enclosure of the electronic apparatus;
   calculating, by the processor, a reference temperature by subtracting a first value which is stored in the memory connected to the processor from the second measured value;
   calculating, by the processor, an amount of a change in surface temperature of the surface of the enclosure from the reference temperature by multiplying a value obtained by subtracting the reference temperature from the first measured value by a quotient obtained by dividing a first transfer function by a second transfer function, the first transfer function being defined by using a first thermal resistance and a first thermal capacitance between a heat source over the substrate and the surface of the enclosure, the second transfer function being defined by using a second thermal resistance and a second thermal capacitance between the heat source and the first temperature sensor;
   calculating, by the processor, an estimate surface temperature by adding the reference temperature to the amount of the change calculated; and
   making, by the processor, the electronic apparatus perform an operation to reduce power consumption when the estimate surface temperature is higher than a threshold value.

2. The enclosure surface temperature estimation method according to claim 1, wherein a first thermal time constant of the first temperature sensor is smaller than a second thermal time constant of the surface.

3. The enclosure surface temperature estimation method according to claim 1, wherein the processor acquires the first measured value at a first sampling period, applies the value obtained by subtracting the reference temperature from the first measured value to a difference equation based on the first transfer function and the second transfer function, and calculates the amount of the change in the surface temperature.

4. The enclosure surface temperature estimation method according to claim 1, wherein the processor determines on the basis of magnitude of a change in the first measured value per unit time whether to perform a first calculation method which calculates the estimate surface temperature on the basis of the first transfer function, the second transfer function, and the first measured value or a second calculation method which calculates the estimate surface temperature by subtracting a second value from the first measured value.

5. The enclosure surface temperature estimation method according to claim 1, wherein the processor:
   detects that a user operates the electronic apparatus; and
   determines on the basis of time for which the user operates the electronic apparatus or a number of times the user operates the electronic apparatus per unit time whether to calculate the estimate surface temperature on the basis of the first transfer function, the second transfer function, and the first measured value or calculate the estimate surface temperature by subtracting a second value from the first measured value.

6. The enclosure surface temperature estimation method according to claim 1, wherein the processor is the heat source.

7. The enclosure surface temperature estimation method according to claim 2, wherein the processor calculates the estimate surface temperature by subtracting a second value from the first measured value when a time constant of a change in the first measured value is greater than the first thermal time constant.

8. The enclosure surface temperature estimation method according to claim 4, wherein the processor calculates the estimate surface temperature by the second calculation method when the magnitude of the change in the first measured value per unit time is smaller than or equal to a third value.

9. The enclosure surface temperature estimation method according to claim 4, wherein when first time elapses after the magnitude of the change in the first measured value per unit time becomes smaller than or equal to a fourth value, the processor performs switching from the first calculation method to the second calculation method and calculates the estimate surface temperature.

10. The enclosure surface temperature estimation method according to claim 8, wherein the third value is calculated on the basis of a first heat transfer coefficient and a third thermal time constant between the heat source and the first temperature sensor, a second heat transfer coefficient and a fourth thermal time constant between the heat source and the surface, and a first allowable difference between a first calculated value obtained by the first calculation method and a second calculated value obtained by the second calculation method.

11. The enclosure surface temperature estimation method according to claim 9, wherein the first time is calculated on the basis of a first heat transfer coefficient and a third thermal time constant between the heat source and the first temperature sensor, a second heat transfer coefficient and a fourth thermal time constant between the heat source and the surface, and a first allowable difference between a first calculated value obtained by the first calculation method and a second calculated value obtained by the second calculation method.

12. A temperature estimation control apparatus for estimating an estimate surface temperature of an enclosure of an electronic apparatus that includes the enclosure, a substrate of the electronic apparatus, a first temperature sensor disposed on the substrate, a second temperature sensor disposed on the substrate, and a memory, the temperature estimation control apparatus comprising:
   a processor disposed over the substrate and configured to acquire a first measured value from the first temperature sensor that is electrically connected to the processor, acquire a second measured value from the second temperature sensor that is electrically connected to the processor and disposed on the substrate such that a thermal time constant of the second temperature sensor is greater than a thermal time constant of the first temperature sensor and a thermal time constant of the surface of the enclosure of the electronic apparatus, calculate a reference temperature by subtracting a first value which is stored in the memory connected to the processor from the second measured value, calculate an amount of a change in surface temperature of the surface of the enclosure from the reference temperature by multiplying a value obtained by subtracting the reference temperature from the first measured value by a quotient obtained by dividing a first transfer function by a second transfer function, the first transfer function being defined by using a first thermal resistance and a first thermal capacitance between a heat source over the substrate and the surface of the enclosure, the second transfer function being defined by using a second thermal resistance and a second thermal capacitance between the heat source and the first temperature sensor, calculate an estimate surface temperature by adding the reference temperature to the amount of the change calculated, and make the electronic apparatus perform an operation to reduce power consumption when the estimate surface temperature is higher than a threshold value.

* * * * *